2,794,791

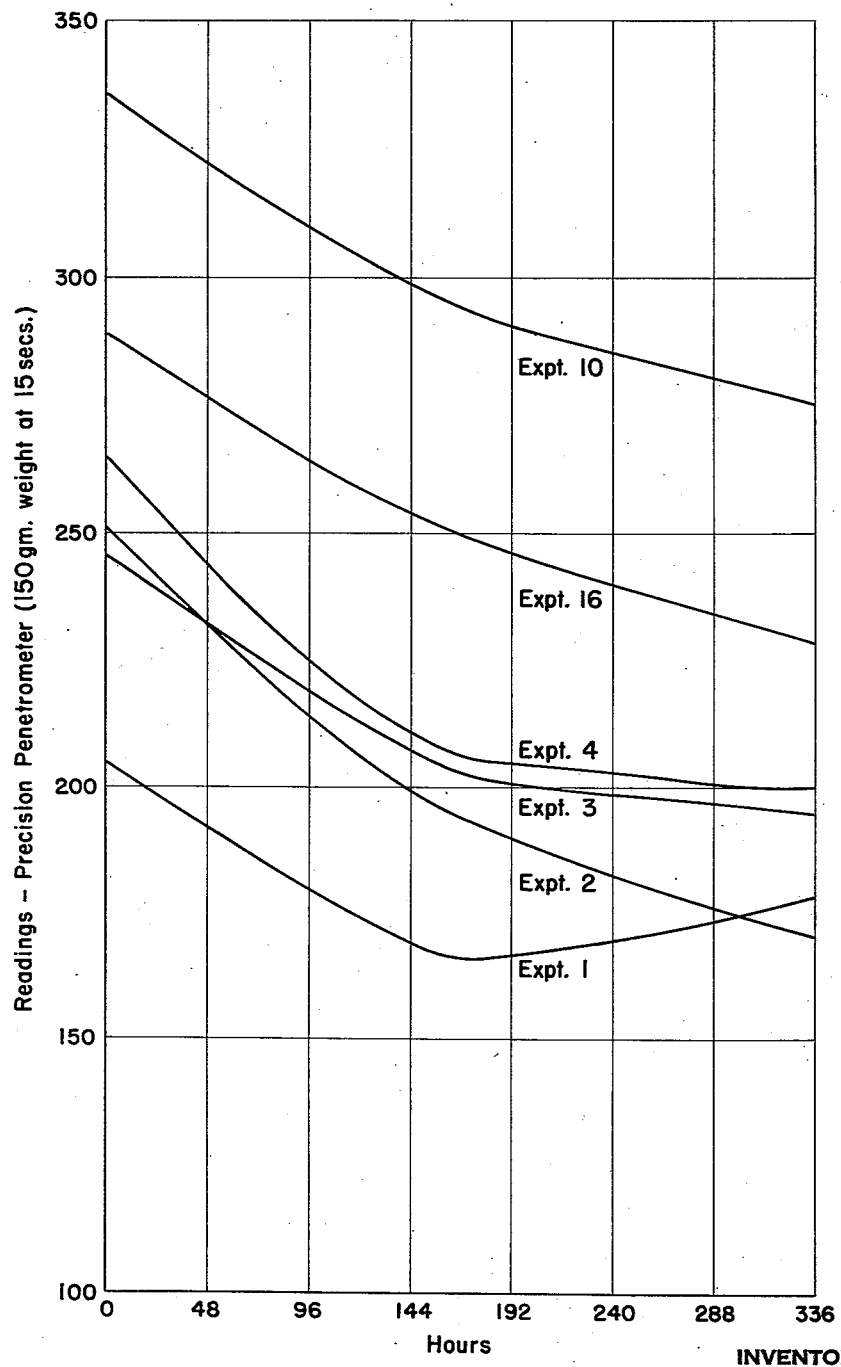

PLASTIGELS CONTAINING HYDROXY FATTY ACID SOAPS

Temple Chapman Patton and Frederick Milton Hall, Westfield, N. J., assignors to The Baker Castor Oil Company, Jersey City, N. J., a corporation of New Jersey Application April 3, 1953, Serial No. 346,754

11 Claims. (Cl. 260—23)

This invention pertains to the preparation of improved vinyl chloride resin plastigels. It is particularly directed to the use of improved gelling agents which yield plastigels having exceptional heat stability.

It has been known in the prior art to use the soaps of non-hydroxy fatty acids as gelling agents for vinyl chloride resin plastigels. Such soaps in low proportions give gels which are undesirably soft at the temperatures, namely, 300–400° F., required for fusion of the plastigels to enable them to attain their maximum strength, and are also so soft at room temperature (prior to fusion) as to have limited practical utility. Other gelling agents have been used, including organic derivatives of montmorillonite. Plastigels formed with these latter agents have the disadvantage of discoloring at the temperatures required for fusion.

It is an object of this invention to produce vinyl chloride resin plastigels having satisfactory heat stability at fusion temperatures. It is a further object of this invention to provide gelling agents which when used in low proportions yield plastigels having a suitably firm consistency for molding operations prior to fusion. Other objects will be apparent from the following description of the invention.

It has now been found that these objects can be attained by the use, as gelling agents, of alkaline earth metal soaps of hydroxy fatty acids having at least 11 carbon atoms. Any of the indicated soaps are satisfactory for this purpose, but it has been found that the barium and calcium soaps give outstanding results in providing a satisfactorily hard gel structure, and in stabilizing the composition so as to prevent discoloration during fusion. Among the hydroxy fatty acids which are suitable for use in the form of their soaps, a particularly preferred group is those having 18 carbon atoms, such as ricinoleic acid, 12-hydroxystearic acid, 9,10-dihydroxystearic acid, dihydroxy oleic acid, sativic acid, and the like. Other suitable hydroxy acids for use in forming the gelling agents of this invention are hydroxy undecanoic acid, sabinic acid, 3,12-dihydroxy palmitic acid, ambrettolic acid, aleuritic acid, jalapinolic acid, juniperic acid, as well as longer chain hydroxy fatty acids. The gelling agents of this invention are suitably used in an amount ranging from about 1 to about 15 weight percent, based on the amount of the vinyl chloride resin.

The vinyl chloride resins which are suitable for use in preparing plastigels include polyvinyl chloride, vinyl chloride-vinyl acetate copolymers, vinyl chloride-vinylidene chloride copolymers, as well as copolymers of vinyl chloride with vinyl propionate, vinyl butyrate, vinyl chloracetate, other vinyl esters of aliphatic or substituted aliphatic acids, vinyl esters of mixed aliphatic-aromatic carboxylic acids, such as the vinyl ester of phenyl acetic acid, vinyl cyanide, styrene, methyl methacrylate, and the like. Particularly suitable resins have particle sizes ranging from 0.02 to 2.0 microns. In general, the stiffness of gels formed with these resins increases as the resin particle size is decreased. Typical examples of desirable polyvinyl chloride-containing resins for use in the compositions of this invention are: Geon 121 (B. F. Goodrich Chemical Co.); Vinylite QYNV (Carbide and Carbon Chemicals Co.); Exon 654 (Firestone Tire and Rubber Co.); and Marvinol VR–10 (Naugatuck Chemical Division of United States Rubber Co.). The gelling agents of this invention can be used with any of the usual plasticizers, fillers, or stabilizers in the formulation and production of improved plastigels.

A particularly suitable plastigel composition comprises the following ingredients in the stated parts by weight:

| | |
|---|---:|
| Vinyl chloride resin | 90–110 |
| Plasticizer | 50–110 |
| Filler | 40–125 |
| Stabilizer | 1–7 |
| Gelling agent of this invention | 1–15 |

If desired, the amounts of one or more of these ingredients may be varied from those stated, but compensating changes in the amounts of the other ingredients are usually required. Pigments can be added as desired.

Usual mixing techniques can be used for the thorough blending of the several ingredients. It is feasible to mix all of the ingredients in one operation in a pony or dough mixer with a sigma blade. If desired, the gelling agent can be added toward the end of the mixing operation. Somewhat more efficient mixing and thickening action are obtained if the gelling agent is dispersed in a portion of the plasticer on a 3-roll mill, or at elevated temperatures and cooled, and then added to the other compounds in the mixer. Similarly, it is desirable to disperse the pigments in a portion of the plasticizer before they are combined with the other ingredients in the mixer. The mixing procedure need not be a lengthy one; mixing times on the order of 20 minutes have been found to be satisfactory.

As indicated, any of the usual plasticizers may be used satisfactorily in the compositions of this invention. A particularly suitable group of plasticizers has been found to be that comprising tricresyl phosphate, dioctyl phthalate, and linear polyesters formed by the esterification of glycols and di-carboxylic acids. There is some tendency for such plasticizers to impart a surface-tack to the plastigel systems; and this tack can be overcome by using a co-plasticizer, notably, the acetylated esters of ricinoleic acid, such as methyl acetoxy ricinoleate, butyl acetoxy ricinoleate, 2-methoxyethyl acetoxy ricinoleate, and the like.

Experimental data on plastigels formed with the gelling agents of this invention, as well as with prior art gelling agents, are presented in the accompanying table. These plastigels were prepared by introducing all of the ingredients into a Werner-Pfleiderer mixer (using cooling water) at the start of the mixing. The total blending time in each case was twenty minutes, this being sufficient to obtain complete mixing. In some instances, as indicated in the table, difficulty was experienced with the plastigel composition sticking to the sigma blade, as well as to the mixer walls. It will be noted that the compositions which did so stick contained a soap of a non-hydroxy fatty acid or a non-alkaline earth metal soap of a hydroxy fatty acid as the gelling agent.

The consistency of the plastigels, as freshly prepared and after aging at room temperature for up to 168 hours, was determined by means of a Precision penetrometer; a 150 gm. weight was used, and the readings were taken after 15 seconds. In addition to the summary of the penetrometer data presented in the table, some of the penetrometer results are presented in the accompanying figure. In general, a desirable range for consistency of the plastigels is from about 150 to about 200 (these being penetrometer readings obtained as indicated above). It is to be noted that compositions containing the gelling agents of this invention (Expts. 1–4 in the figure) have consistencies in this range. Soap-type gelling agents not covered by this invention form plastigels (penetrometer readings greater than 200; Expts. 10 and 16 in the figure), which are much too soft for practical consideration.

Simple shaped pieces of the plastigels were fused for 10 minutes at 350° F. to determine their heat and dimensional stability. The gelling agents of this invention gave superior results on this test, the plastigels containing barium and calcium ricinoleate being outstanding. The best previously available gelling agent, namely, Bentone 34, did not pass this test, as it darkened to an unsatisfactory extent.

In the table, resin A is polyvinyl chloride; resin B is vinyl chloride-vinyl acetate copolymer; and resin C is vinyl chloride-vinylidene chloride copolymer. The phthalic acid and ricinoleic acid esters are used as the plasticizers, while the filler used is a treated whiting. Bentone 34 is an organophilic montmorillonite. BVS, as a 50:50 blend with the indicated plasticizer, is used as the stabilizer throughout, and is a modified barium ricinoleate. It will be noted that this compound was used in sufficient amount in experiment 1 to take over the functions of both the stabilizer and the gelling agent. The other gelling agents are also used as 50:50 blends with the indicated plasticizers. P–4 stands for methyl acetoxy ricinoleate; Flexricin 62 stands for a modified 2-methoxyethyl acetoxy ricinoleate (Flexricin being a registered trademark of The Baker Castor Oil Co.). The amounts of the ingredients used in the several compositions are shown in parts by weight.

The advantageous results obtained with the gelling agents of this invention are shown by the data reported in the table for the following experiments:

| Experiment No. | Gelling Agent |
| --- | --- |
| 1 | Barium ricinoleate. |
| 2, 3, 5–9 | Calcium ricinoleate. |
| 4 | Magnesium ricinoleate. |
| 12 | Strontium ricinoleate. |
| 13 | Calcium 3, 12-dihydroxy palmitate. |
| 14 | Calcium hydroxy-undecanoate. |

Comparative data for other gelling agents are listed under the following experiments:

| Experiment No. | Gelling Agent |
| --- | --- |
| 10 | Sodium palmitate. |
| 15 | Aluminum ricinoleate. |
| 16 | Aluminum laurate. |
| 18 | Aluminum octoate. |
| 11 | Barium stearate. |
| 19 | Calcium oleate. |
| 20 | Magnesium undecanoate. |
| 21 | Zirconium hydroxy-undecanoate. |
| 17 | Bentone 34. |

It can readily be seen from the experimental data that the gelling agents of this invention constitute a substantial advance over the prior art, as their use enables the production of completely satisfactory plastigels. Prior art soap-type gelling agents form plastigels which are so soft as to have limited utility. And the prior art gelling agent which forms satisfactorily stiff gels is not sufficiently stable at the required fusion temperature. Both of these drawbacks are overcome by the instant gelling agents.

The plastigels of this invention may be molded, calendered, spread, embossed, extruded, etc. at room temperature and under moderate pressures. After the plastigels have been formed into desired shapes, they do not need any special support prior to or during the fusion step. Typical applications for the plastigels include floor tile, continuous sheeting, wire coatings, cloth coating, tubing, molded objects containing inserts, orthopedic appliances, caulking compounds, gaskets, potting compounds and the like.

Numerous other modifications and variations in the invention described herein will be apparent to those skilled in the art, and are within the spirit and scope of the appended claims.

Table

| Expt. No. | 1 | 2 | 3 | 4 | 5 | 6 | 7 | 8 | 9 | 10 |
| --- | --- | --- | --- | --- | --- | --- | --- | --- | --- | --- |
| Resin A | 100 | 100 | 100 | 100 | | | 100 | 100 | 100 | 100 |
| Resin B | | | | | 100 | | | | | |
| Resin C | | | | | | 100 | | | | |
| Di-octyl Phthalate | 20 | 30 | 20 | 30 | 30 | 30 | 60 | 30 | 25 | 30 |
| Butyl acetoxy ricinoleate | | | | | 25 | | | | | |
| Methyl acetoxy ricinoleate | 20 | 25 | 20 | 25 | | 25 | 50 | 25 | 20 | 25 |
| 2-methoxyethyl acetoxy ric. | 20 | | 15 | | | | | | | |
| Whiting | 50 | 50 | 50 | 50 | 50 | 50 | 125 | 45 | 40 | 50 |
| Bentone 34 | | | | | | | | | | |
| BVS-P–4 | 15 | 5 | | 5 | 5 | 5 | 2 | 7 | 5 | 5 |
| BVS-Flexricin 62 | | | 5 | | | | | | | |
| Mg. ric.-P–4 | | | | 10 | | | | | | |
| Ca ric.-P–4 | | 10 | | | 10 | 10 | 2 | 20 | 30 | |
| Ca ric.-Flexricin 62 | | | 10 | | | | | | | |
| Ba st.-P–4 | | | | | | | | | | |
| Sr ric.-P–4 | | | | | | | | | | |
| Ca di-OH palm.-P–4 | | | | | | | | | | |
| Na palm.-P–4 | | | | | | | | | | 10 |
| Ca OH-und.-P–4 | | | | | | | | | | |
| Al laurate-P–4 | | | | | | | | | | |
| Al ric.-P–4 | | | | | | | | | | |
| Al octoate-P–4 | | | | | | | | | | |
| Ca oleate-P–4 | | | | | | | | | | |
| Mg und.-P–4 | | | | | | | | | | |
| Zr OH-und.-P–4 | | | | | | | | | | |
| Sticking to Mill | O. K. | O. K. | O. K. | O. K. | O. K. | O. K. | O. K. | O. K. | O. K. | sticks |
| Penetrometer | O. K. | O. K. | O. K. | O. K. | O. K. | O. K. | O. K. | O. K. | O. K. | Too soft |
| Fusion at 350° F | No Darkening. | No Darkening. | No Darkening. | No Darkening. | No Darkening. | No Darkening. | No Darkening. | No Darkening. | No Darkening. | Bad Darkening. |

| Expt. No. | 11 | 12 | 13 | 14 | 15 | 16 | 17 | 18 | 19 | 20 | 21 |
|---|---|---|---|---|---|---|---|---|---|---|---|
| Resin A | 100 | 100 | 100 | | | 100 | 100 | 100 | 100 | 100 | 100 |
| Resin B | | | | 100 | | | | | | | |
| Resin C | | | | | 100 | | | | | | |
| Di-octyl Phthalate | 30 | 30 | 30 | 30 | 30 | 30 | 30 | 30 | 30 | 30 | 30 |
| Butyl acetoxy ricinoleate | 30 | | | | | | | | | | |
| Methyl acetoxy ricinoleate | | 30 | | 30 | 30 | 25 | 30 | 25 | 30 | 30 | 30 |
| 2-methoxy ethyl acetoxy ric | | | 30 | | | | | | | | |
| Whiting | 50 | 50 | 50 | 50 | 50 | 50 | 50 | 50 | 50 | 50 | 50 |
| Bentone 34 | | | | | | | 5 | | | | |
| BVS-P-4 | 5 | 5 | 5 | 5 | 5 | 5 | | 5 | 5 | 5 | 5 |
| BVS-Flexricin 62 | | | | | | | | | | | |
| Mg. ric.-P-4 | | | | | | | | | | | |
| Ca ric.-P-4 | | | | | | | | | | | |
| Ca ric.-Flexricin 62 | | | | | | | | | | | |
| Ba st.-P-4 | 10 | | | | | | | | | | |
| Sr ric.-P-4 | | 10 | | | | | | | | | |
| Ca di-OH palm.-P-4 | | | 10 | | | | | | | | |
| Na palm.-P-4 | | | | | | | | | | | |
| Ca OH-und.-P-4 | | | | 10 | | | | | | | |
| Al laurate-P-4 | | | | | | 10 | | | | | |
| Al ric.-P-4 | | | | | 10 | | | | | | |
| Al octoate-P-4 | | | | | | | | 10 | | | |
| Ca oleate-P-4 | | | | | | | | | 10 | | |
| Mg und.-P-4 | | | | | | | | | | 10 | |
| Zr OH-und.-P-4 | | | | | | | | | | | 10 |
| Sticking to Mill | sticks | O. K. | O. K. | O. K. | sticks | sticks | O. K. | O. K. | sticks | sticks | sticks |
| Penetrometer | Too soft | O. K. | O. K. | O. K. | Too soft | Too soft | O. K. | Poor gel structure | Too soft | Too soft | Too soft |
| Fusion at 350° F | O. K. | No darkening. | No darkening. | No darkening. | O. K. | O. K. | Darkens | Darkens | O. K. | O. K. | O. K. |

What is claimed is:

1. A plastigel composition comprising a fluid dispersion of a vinyl chloride-containing resin in a liquid plasticizer, and, in sufficient amount to effect gelation of said dispersion, from 1 to 15 weight percent, based on the amount of said resin, of an alkaline earth salt of a hydroxy fatty acid containing at least 11 carbon atoms, said composition, after being aged at room temperature for about 300 hours, having a Precision penetrometer reading (150 gm. weight at 15 seconds) of from about 150 to about 200.

2. The composition of claim 1, in which said vinyl chloride-containing resin is polyvinyl chloride.

3. The composition of claim 1, in which said vinyl chloride-containing resin is a vinyl chloride-vinyl acetate copolymer.

4. The composition of claim 1, in which said vinyl chloride-containing resin is a vinyl chloride-vinylidene chloride copolymer.

5. The composition of claim 1, in which said hydroxy fatty acid has eighteen carbon atoms.

6. The composition of claim 1, in which said salt is calcium ricinoleate.

7. The composition of claim 1, in which said salt is barium ricinoleate.

8. A plastigel composition comprising a fluid dispersion of 90–110 parts by weight of a vinyl chloride-containing resin in 50–110 parts by weight of a liquid plasticizer, and, as a gelling agent for said dispersion, 1–15 parts by weight of an alkaline earth salt of a hydroxy fatty acid containing at least 11 carbon atoms, said composition, after being aged at room temperature for about 300 hours, having a Precision penetrometer reading (150 gm. weight at 15 seconds) of from about 150 to about 200.

9. A plastigel composition comprising a fluid dispersion of 90–110 parts by weight of a vinyl chloride-containing resin, 40–125 parts by weight of a filler, and 1–7 parts by weight of a stabilizer in 50–110 parts by weight of a liquid plasticizer, and, as a gelling agent for said dispersion, 1–15 parts by weight of an alkaline earth salt of a hydroxy fatty acid containing at least 11 carbon atoms, said composition, after being aged at room temperature for about 300 hours, having a Precision penetrometer reading (150 gm. weight at 15 seconds) of from about 150 to about 200.

10. The composition of claim 9, in which said plasticizer is a blend of dioctyl phthalate and an acetylated ester of ricinoleic acid.

11. The composition of claim 9, in which said plasticizer is a blend of dioctyl phthalate and methyl acetoxy ricinoleate.

References Cited in the file of this patent

Rubber Age, article by Partridge et al., vol. 67, No. 5, August 1950, pages 553–560.

Modern Plastics, article by Parker et al., vol. 30, No. 6, February 1953, pages 129, 130, 132, 134 and 218.